No. 808,746. PATENTED JAN. 2, 1906.
J. HIST.
POTATO DIGGER.
APPLICATION FILED FEB. 11, 1905.
2 SHEETS—SHEET 2.
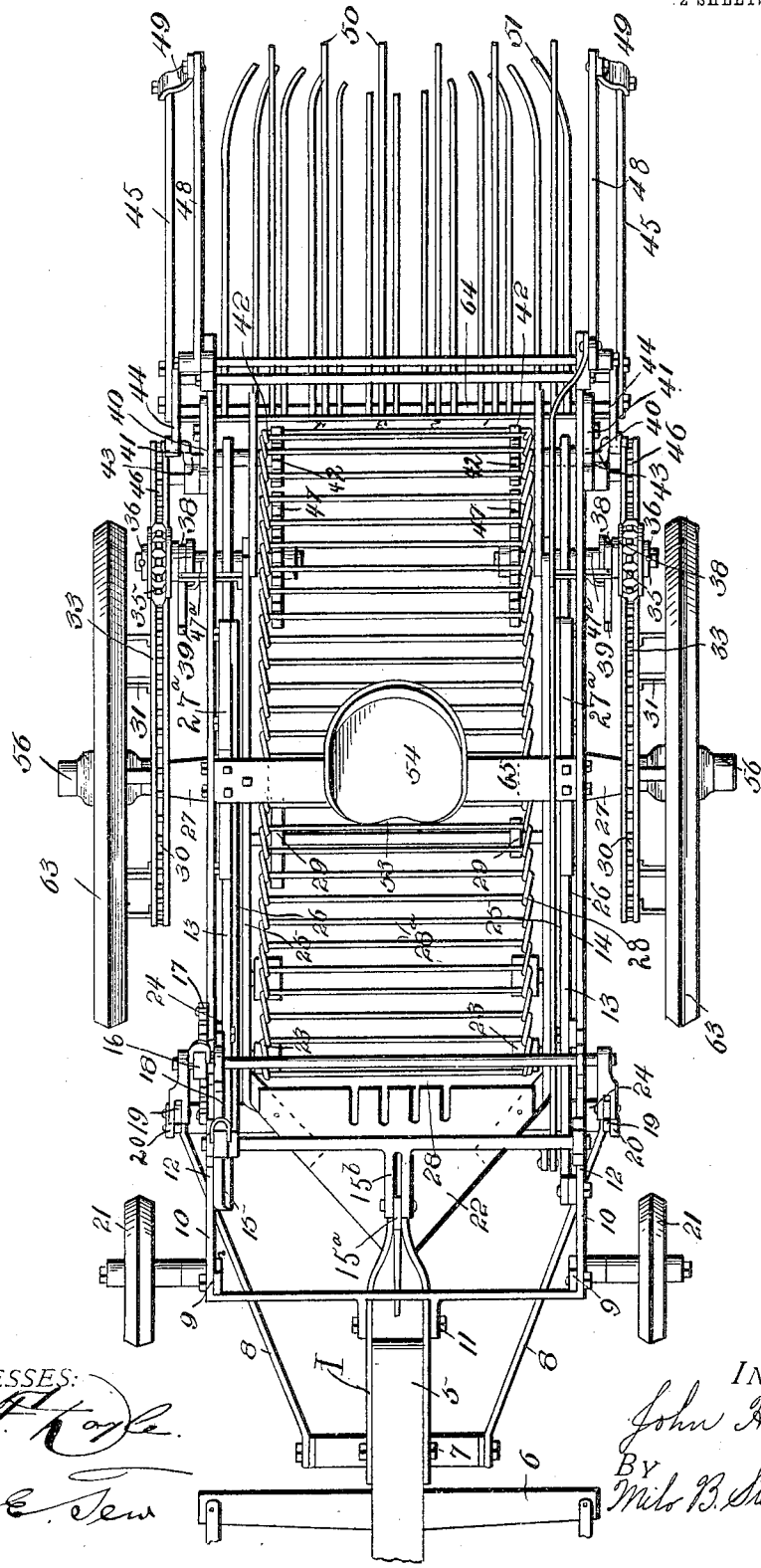
WITNESSES:
INVENTOR
John Hist,
BY
Milo B. Stevens & Co.
Attorneys

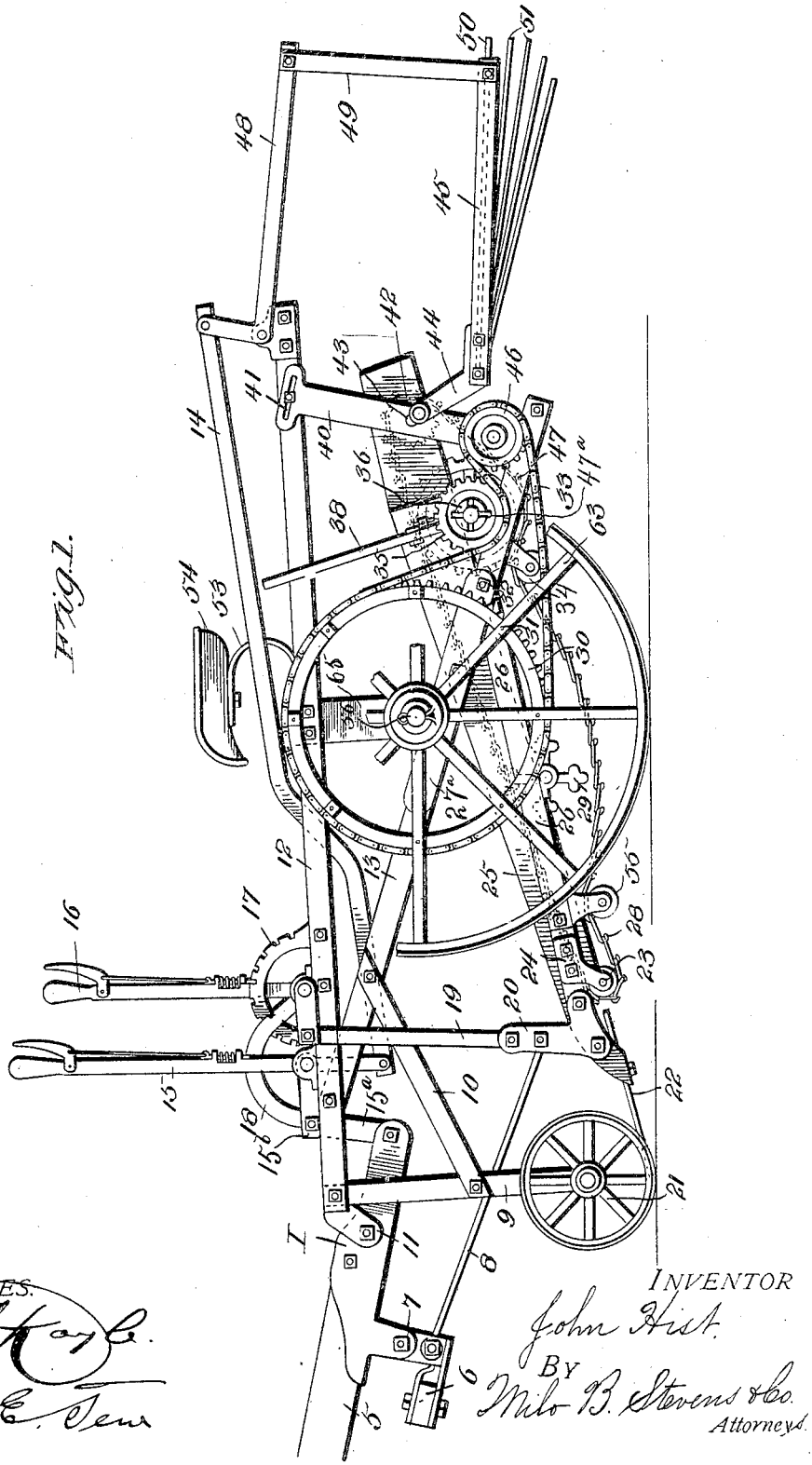

UNITED STATES PATENT OFFICE.

JOHN HIST, OF ORANGE TOWNSHIP, CUYAHOGA COUNTY, OHIO.

POTATO-DIGGER.

No. 808,746.     Specification of Letters Patent.     Patented Jan. 2, 1906.

Application filed February 11, 1905. Serial No. 245,208.

*To all whom it may concern:*

Be it known that I, JOHN HIST, a citizen of the United States, residing in Orange township, in the county of Cuyahoga and State of Ohio, have invented new and useful Improvements in Potato-Diggers, of which the following is a specification.

This invention relates particularly to that class of potato-diggers having a shovel hung from the main frame thereof, with an endless carrier and agitator which swings with the shovel and acts to carry potatoes to the rear of the machine, and a vibrating screen or shaker associated with grass-rods at the rear of the machine to dislodge the potatoes from the vines and other refuse. It is characterized by improvement and novelty, as will more fully appear from the following description and claims.

In the accompanying drawings, Figure 1 is a side elevation of the machine. Fig. 2 is a plan view thereof.

Referring specifically to the drawings, 5 indicates the tongue, and 6 the whiffletree or draft-evener, pivotally hung at 7 from a socket-piece I at the rear end of the tongue.

8 represents draft-rods connected to the tongue and to hangers 20, which carry the shovel 22. The gage-wheels 21 are carried by arms 9, which are braced by rods 10, connected to bars 13 of the main frame. Said arms 9 depend from the upper bars 12 of the main frame, which frame is hinged to the tongue-socket I at 11. The rear end of the socket-piece is connected by a link $15^a$ to an arm $15^b$, projecting from the rock-shaft of the hand-lever 15. It will thus be seen that the tongue forms a lever, and when the hand-lever 15 is swung back the rear end of the tongue and the front end of the machine are lifted, raising the gage-wheels and shovel from the ground, the frame swinging on the main axle as a pivot. The hand-lever is also connected by a rod 14 with a bent lever 48, which carries the shaker at the rear end of the machine, so that when the front end of the machine is lifted or lowered the shaker is also lifted or lowered with one operation of the hand-lever 15.

The depth of the shovel is regulated by a hand-lever 16 and its quadrant 17. This lever is connected by links 19 to the hangers 20 of the shovel, which may thus be raised in an obvious manner. The hangers 20 are bolted at the front ends of side bars 26, which are pivoted at 32 to the frames 13, so that the shovel and carrier may be swung up and down.

The endless carrier comprises chain belts 28 and cross-rods $28^a$ and passes around a roller 23, journaled on brackets 24, bolted to side bars 26, and around sprockets 42 and 47, driven from the main wheels. The belts also pass over idlers 55 and 34.

25 represents side shields beside the carrier, and 29 is an agitator to shake the carrier. The main wheels 63 have driving-sprockets 30, secured by arms 31 to the spokes, and the driving-chains 33 pass around these sprockets and the sprockets 35 and 46. The sprockets 42 and 46 are carried by arms 40, hinged to the rear ends of bars 13 and connected to the rear ends of the frames 12 by slot and bolt at 41.

36 is a clutch on shaft $47^a$, operated by lever 38 to throw the machine in and out of gear.

43 represents cranks connected to arms 44 to vibrate the shaker, which has side bars 45 and grass and potato rods 50 and 51, projecting from a bar 64. The seat and its spring are indicated at 54 and 53, respectively. The rear ends of the frame are connected by links 49 to the bent lever 48, heretofore referred to.

The main wheels 63 are carried on stub-axles 56, which are secured to angular pieces 27, which support the main frame of the machine. At the upper end these pieces are bolted to the frames 12 and to a cross-bar 65, forming the arch, and at the lower ends the said pieces have angular branches $27^a$, which are fitted upon and bolted to the bars 13.

When the lever 15 is pulled back, the front end of the frame swings up and clears the gage-wheels 21 and shovel 22 from the ground, and the shaker at the rear is also tilted up. This clears the whole surface from the ground, excepting the two drive-wheels, and gives a very convenient machine for turning around or backing up, allowing the machine to be given a sulky turn, which would be impossible if the gage-wheels remained on the ground. The connection 8 between the draft devices and the shovel gives a direct pull on the latter where the greatest draft comes, and so relieves the frame from strain and gives the team a direct pull. The quadrant 18 of the lever 15 is not notched, except at one place, where the latch engages when the frame is lifted. So the lever floats or swings free when the gage-wheels are down and allows the wheels and shovel to follow the variations of the ground.

What I claim as new, and desire to secure by Letters Patent, is—

1. In a potato-digger, in combination, a main frame having a gage-wheel at the front end, a vertically-swinging frame pivoted on said frame and having a shovel at its front end, the shovel being adjustable vertically with respect to the main frame and gage-wheel, a tongue hinged to the main frame, and a lever fulcrumed on the main frame and connected to the tongue and adapted to lift the front end of the main frame, which lever swings free when the main frame is lowered.

2. In a potato-digger, in combination, a tilting frame comprising upper and lower side bars, the inclined bars 13 extending therebetween, and an arch-bar fixed to the upper side bars and having angular branches which fit upon and are secured to the said inclined bars, and carrying stub-axles for the wheels.

3. In a potato-digger, in combination, a tilting and adjustable frame comprising upper side bars, inclined bars rigid therewith and extending downwardly and backwardly therefrom, lower shovel-supporting bars pivoted at the rear ends to the inclined bars and projecting forwardly therefrom, and a lever fulcrumed on the upper bars and connected to the front ends of said lower bars.

In testimony whereof I have signed my name to this specification in the presence of two subscribing witnesses.

JOHN HIST.

Witnesses:
JOHN A. BOMMHARDT,
LOTTIE NEWBURN.